US011489459B2

(12) United States Patent
Hogan et al.

(10) Patent No.: US 11,489,459 B2
(45) Date of Patent: Nov. 1, 2022

(54) DISTRIBUTED CURRENT BALANCING CONTROL

(71) Applicant: Hamilton Sundstrand Corporation, Charlotte, NC (US)

(72) Inventors: Diarmaid John Hogan, Cork City (IE); Andrei Dinu, Leicester (GB); Sebastian Pedro Rosado, Nuremberg (DE); Virgilio Valdivia Guerrero, Getafe (ES); Rodrigo Fernandez-Mattos, Solihull (GB)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 0 days.

(21) Appl. No.: 17/323,103

(22) Filed: May 18, 2021

(65) Prior Publication Data

US 2021/0367534 A1 Nov. 25, 2021

(30) Foreign Application Priority Data

May 20, 2020 (EP) .................................... 20275090

(51) Int. Cl.
*H02M 7/493* (2007.01)
*H02M 7/5395* (2006.01)
*H02P 27/08* (2006.01)

(52) U.S. Cl.
CPC ......... *H02M 7/5395* (2013.01); *H02M 7/493* (2013.01); *H02P 27/08* (2013.01)

(58) Field of Classification Search
USPC .......................................................... 307/31
See application file for complete search history.

(56) References Cited

U.S. PATENT DOCUMENTS

| 5,796,601 | A | 8/1998 | Yamamoto |
| 6,751,106 | B2 | 6/2004 | Zhang et al. |
| 7,859,871 | B2 | 12/2010 | Angerer et al. |
| 9,991,719 | B2 | 6/2018 | Krolak et al. |
| 10,211,728 | B2 | 2/2019 | Hu et al. |
| 10,291,111 | B1 | 5/2019 | Rosado et al. |
| 10,454,393 | B2 | 10/2019 | Paschedag et al. |
| 2012/0063179 | A1* | 3/2012 | Gong ...................... H02M 1/12 363/40 |
| 2016/0329705 | A1* | 11/2016 | Lacaux ................. H02M 1/126 |

OTHER PUBLICATIONS

Extended European Search Report for International Application No. 20275090.7 dated Oct. 27, 2020, 8 pages.
Venkataramanan, "Parallel Operation of Voltage Source Inverters with Minimal Intermodule Reactors", in proc. of IEEE Industry Applications Conference, 2004, 7 pages.
Zhihong, Ye, Control of Circulating Current in Two Parallel Three-Phase Boost Rectifiers, IEEE Transactions on Power Electronics, vol. 17, No. 5, pp. 609-615, Sep. 2002.

* cited by examiner

*Primary Examiner* — Rexford N Barnie
*Assistant Examiner* — Xuan Ly
(74) *Attorney, Agent, or Firm* — Cantor Colburn LLP

(57) ABSTRACT

A power converter for providing power to one or more loads, wherein the power converter is configured to be arranged in a parallel configuration with one or more additional power converters. The power converter comprises an inverter for receiving an input voltage and converting this to an output voltage having an associated output current, a module configured to modulate the output voltage using a modulation scheme and first and second feedback circuits.

14 Claims, 7 Drawing Sheets

DISTRIBUTED CURRENT BALANCING CONTROL

CROSS-REFERENCE TO RELATED APPLICATIONS

This application claims priority to European Patent Application No. 20275090.7 filed May 20, 2020, the entire contents of which is incorporated herein by reference.

FIELD

The present disclosure relates generally to a distributed system (or electronic control architecture) for controlling one or more loads. The system comprises a plurality of power converters (e.g., motor drives). The plurality of power converters may be used to power (e.g., control or actuate) the one or more loads. The power converters may be arranged in a parallel configuration and could be configured to power (e.g., control or actuate) a single load, or a plurality of loads. In the latter case the output of the power converters could be connected to the loads via a switch that is configured to electrically connect each load with a selected one or more of the plurality of power converters. The power converters could be located on an aircraft and may be configured to power (e.g., control or actuate) one or more aircraft components such as a thrust reverser or landing gear actuator. However the system or architecture disclosed herein is also applicable to ground based applications, such as pumps or other loads. The load could be any type of motor and in such cases the power converters could be referred to as motor drives.

BACKGROUND

Electronic control architectures may be provided with power converters, that is, an electrical circuit which accepts an input (e.g., AC or DC) and generates an output (e.g., AC or DC) of a different voltage. The development of such power converters is a significant part of the development of a new control architecture, program or system. It is envisioned that standardised power converters could significantly reduce development costs, by providing the ability for one or more loads to be controlled using multiple power converters.

To facilitate wide power requirement ranges of the one or more loads, it may be necessary to use a plurality of power converters operating in parallel. Mutualised or multiplexed power converter architectures become more relevant as the number of electronic components increases. This is the case, for example, in the aircraft industry as more electronically controlled components are used.

In such systems, a plurality of power converters may be interfaced to electrical loads through a switch that can reconfigure the connection between electrical loads and power converters. In the case of an aircraft, certain loads may not be used simultaneously during a flight or at the same point in time, such as a landing gear actuator and thrust reverser actuator. As such, these components can in theory be powered by the same power converter, with the switch reconfiguring the connection accordingly.

FIG. 1 illustrates some examples of power converter (in this case motor drive) systems and how they might be connected to loads. The graph on the left-hand side illustrates the power requirements of the loads 1, 2 and 3, showing that at any point in time the loads do not simultaneously require power.

The first example 1 includes four motor drives connected to three loads, wherein motor drives 1 and 2 are connected in a simple manner to a respective load each. Motor drives 3 and 4 are connected in a slightly more complex manner, such that their outputs are combined and used to drive a single load.

The second example 2 includes just two motor drives connected in a multiplexed manner to the same three loads of the first example 1. Due to the use of a switch the two motor drives are able to power the three loads to the same extent as the four motor drives of the first example 1.

The benefit of a combined or multiplexed approach is the potential reduction of weight and increase of drive availability compared to conventional architectures.

To take the maximum advantage of the combined or multiplexing concept (in particular the latter), paralleling control architectures for power converters is a critical technology, which enables large loads to be powered by the parallel connection of multiple power converters. This avoids having to dimension one power converter for maximum load power, for example.

Solutions for providing parallel power converters (e.g., motor drives) should be aimed at reducing weight, for example of the various components used within the architecture. It has also been found that the use of scalable and modular solutions may be important in enabling power converter inverters to operate in standalone or a parallel configuration to a variable number of power converters (e.g., two or more power converters in parallel). The aim of the present invention, as discussed in more detail below, is to achieve this without significant need for reconfiguration of the control architecture.

The operation of power converters in parallel presents operating challenges due to the interconnection of multiple switching elements in parallel, and the potential circulating current flow paths that are not present in standard single drive and single load configurations. An illustration of these circulating current flow paths is shown in FIG. 2.

FIG. 2 shows a dual motor drive system with a single load 20 (in this case a motor) powered by two motor drives 22 including output inductors 24.

FIG. 2 illustrates the various current sequence flows. These are known in the art as positive, negative and zero sequence currents. These correspond broadly to the three current phases and are the mechanisms that generate circulating current. They may apply to any three-phase system that is not balanced in terms of output load (see three connections from each motor drive).

FIG. 2 shows, as examples, a DC zero sequence flow path 10, a zero sequence flow path 11 going through the load (noise), an AC positive/negative sequence flow path 12, a differential mode ("dm") DC current path 13 and, for completeness, the useful load current 14 for driving the load.

Circulating currents may be created when two or more motor drive power converters are connected in parallel, such that additional current paths are formed allowing for current recirculation among them. Current recirculation is generally undesirable because it unnecessarily increases the level and ripple of the current going through the power converter devices, decreasing conversion efficiency. Large circulating currents could also increase device stresses (reducing lifetime), and in some cases even damage equipment.

Sources of current re-circulation include differences in circuit impedances, differences in tolerances in the propagation time of gate drivers, and drifting of modulation signals.

A method to limit circulating current commonly applied in industry is the use of interphase power transformers ("IPTs"). IPTs are typically applied instead of individual inductors, and exhibit low impedance between the inverter and its respective motor drive, but high impedance between inverters. This way, circulating currents between inverters can be minimised.

However, IPTs typically have a large weight. Moreover, it has been found that they are not a particularly good option for a multiplexed system since a large number of IPTs would typically be required.

Paralleling of motor drives has been previously addressed by industry and multiple solutions are known. Two relevant control based approaches will now be discussed to highlight the drawbacks of existing solutions.

A first architecture for operating a multitude of power converters in parallel is discussed in U.S. Pat. No. 9,991,719, which is incorporated by reference herein in its entirety. This scheme includes a "load balancer" control structure which claims to regulate circulating currents arising from component tolerance, sensor tolerance, etc. This load balancer control element monitors the output of a plurality of parallel modular power converters and can facilitate output equalization (i.e., ensuring all modules output the same current magnitude) and synchronization. The proposed structure is claimed to be applicable for both AC and DC applications.

The load balancing control element of U.S. Pat. No. 9,991,719 is implemented in a centralised manner, with all outputs from a multitude of power converters being fed back to a control scheme. An aim of the present disclosure is to avoid the need for a centralised control scheme.

U.S. Pat. No. 10,454,393 discloses a current balancing control scheme as part of the power inverter parallel control architecture, and is incorporated by reference herein in its entirety. Here a global control element is used, where the circulating current and zero sequence currents are calculated. Similar to the structure proposed in U.S. Pat. No. 9,991,719, the circulation current module is described as calculating the circulating current for the multitude of motor drives operating in parallel. This structure is also a centralised approach, since the module requires a measure of all phase currents from each of the power converters operating in parallel. The calculated circulation value is then added to the control reference generated via the inner current control loops. The zero sequence compensation is calculated in a centralised manner and a control reference is calculated to be shared to all motor drives operating in the parallel system.

Both of the conventional arrangements use a centralised technique, which, as noted above, the present disclosure aims to avoid as much as possible. This means that a parallel architecture can be employed, but with reduced weight and improved scalability. There remains a need to maintain performance by reducing circulating currents to avoid the negative impacts identified above. These are the aims of the present disclosure as discussed in more detail below.

SUMMARY

In accordance with an aspect of the present disclosure, there is provided a power converter for providing power to one or more loads, wherein the power converter is configured to be arranged in a parallel configuration with one or more additional power converters.

The power converter comprises an inverter for receiving an input voltage and converting this to an output voltage having an associated output current, a module configured to modulate the output voltage using a modulation scheme, a first feedback circuit and a second feedback circuit.

The first feedback circuit is configured to configured to generate a first signal, wherein the first signal corresponds to a summation of a first reference signal and a first measurement/calculation of the output current scaled by a first gain, wherein the first gain is set so as to reduce circulating currents between the power converter and one or more additional power converters in the parallel configuration due to imbalance of positive and/or negative sequence currents.

The second feedback circuit is configured to compare a second reference signal and a second measurement/calculation of the output current to produce an error value, wherein the error value is scaled by a second gain to produce a second signal, wherein the second gain is set so as to reduce circulating currents between the power converter and one or more additional power converters in the parallel configuration due to the imbalance of zero sequence currents.

The modulation module is configured to receive the first signal and the second signal and adjust the modulation based on the first signal and the second signal so as to reduce circulating currents as aforesaid.

The above features provide a power converter that is better adapted to minimise the impact of circulating currents whilst avoiding the need for a centralised control technique to do so. Adopting first and second feedback circuits on the power converter itself achieves these effects and solves the problems identified above with conventional techniques.

The power converter may be a motor drive, and the one or more loads may be or comprise one or more motors. The reduction in circulating currents is seen as particularly applicable to such implementation, although the present disclosure is not limited as such and may be applied to any type of power converter or load.

The input voltage may be a DC input voltage.

The output voltage may be a three-phase output voltage.

The modulation scheme may use or include pulse width modulation, for example space vector modulation.

The first reference signal used in the first feedback circuit may be a modulation setpoint, for example a setpoint for use in the pulse width modulation.

The first gain may be set such that, for a range of values of the output current, a value of the first gain is chosen that reduces circulating currents between the power converter and one or more additional power converters in the parallel configuration due to imbalance of positive and/or negative sequence currents. It will be appreciated that differences exist between various systems, but the skilled person could choose or determine suitable values for the first gain using any suitable technique. For example, the first gain could be preset or otherwise predetermined as part of a calibration or pre-processing routine.

The first gain could be preset or predetermined using frequency response analysis, e.g., a Bode plot analysis, so as to provide values of the first gain to be applied to the range of values of the output current that reduce the circulating currents between the power converter and one or more additional power converters in the parallel configuration due to imbalance of positive and/or negative sequence currents as aforesaid.

The error value of the second feedback circuit may correspond to a difference between the second reference signal and the second measurement or calculation of the output current. That is, the error value may be correlated with the difference, such that as the difference increases, so does the error value, and vice versa. This can help ensure that the circulating currents are minimised.

Where the modulation scheme uses space vector modulation, the modulation module may comprise a processor or circuitry configured to modify one or more vectors used in the space vector modulation based on the second signal.

The processor or circuitry of the modulation module may be configured to adjust a length or duration of one or more vectors based on the second signal. This is a particularly useful way of adjusting the modulation to reduce circulating currents between the power converter and one or more additional power converters in the parallel configuration due to the imbalance of zero sequence currents as aforesaid. For example, the processor or circuitry of the modulation module may be configured to drive a modulation signal based on a zero state vector, which modulation signal is used to adjust the length or duration of the zero state vector by the processor or circuitry as aforesaid.

Generally, the modulation module may be configured to adjust a modulation duty cycle based on the first signal and/or the second signal so as to reduce circulating currents as aforesaid. Additionally, or alternatively the modulation module may be configured to adjust a length or duration of one or more vectors of a space vector modulation scheme based on the first signal and/or the second signal to so as to reduce circulating currents as aforesaid. Either or both of these methods could be used to implement the current balancing arrangement, although they should not be seen as essential to the broadest aspects of the present disclosure.

The system may comprise a plurality of power converters, each as claimed in any preceding claim, wherein the power converters are arranged in a parallel configuration and configured to control one or more loads, wherein the first and second feedback circuits of each power converter are configured as aforesaid so as to reduce circulating currents between the power converters.

The system may further comprise a structure configured to receive and hold multiple power converters, wherein the structure is configured to interconnect the power converters held and received within the structure such that a variable number of power converters may be interconnected using the structure as desired. This provides an easily scalable, modular system that can power one or more loads using a variable number of power converters. This is particularly useful if the system is implemented for different loads.

The structure may be configured such that a single power converter can be connected thereto for providing power to one or more loads in a standalone configuration, as well as up to N power converters connected thereto for providing power to one or more loads in a parallel configuration, wherein N is an integer greater than 1. This further defines the above to provide a scalable, modular system optimised for using any number of power converters with any number of loads.

Unless otherwise indicated, the various method steps, functional elements, stages, "modules" and "means" of the disclosure (e.g., the system described above) may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

The various method steps, functional elements, stages, "modules" and "means" of any aspects or embodiments of the present disclosure (e.g., the system described above) may be implemented at least partially using software, e.g., computer programs.

It will thus be seen that when viewed from further aspects the present disclosure provides computer software specifically adapted to carry out the method steps, functional elements, stages, "modules" and "means", etc., herein described (e.g., the system described above) when installed on data processing means, a computer program element comprising computer software code portions for performing the methods herein described when the program element is run on data processing means, and a computer program comprising code means adapted to perform all the steps of a method or of the methods herein described when the program is run on a data processing system.

The software or computer system adapted to carry out the method steps, functional elements, stages, "modules" and "means" of any aspects or embodiments of the present invention (e.g., the system described above) may be implemented on a single device.

BRIEF DESCRIPTION OF THE DRAWINGS

Various embodiments will now be described, by way of example only, and with reference to the accompanying drawings in which.

DETAILED DESCRIPTION

Figure 1:
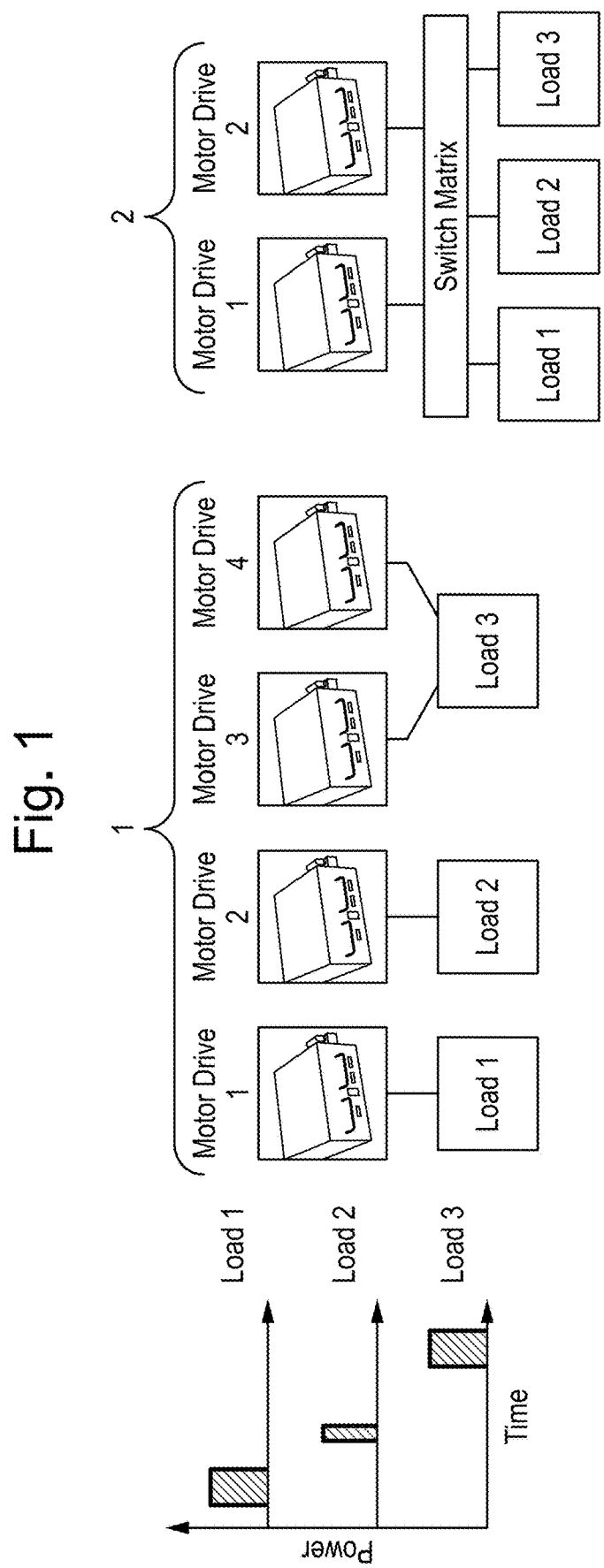
FIG. 1 illustrates some examples of power converter (in this case motor drive) systems and how they might be connected to loads.

Herewith will be described various embodiments of a distributed system (or electronic control architecture) for controlling one or more loads. The system comprises a plurality of power converters, which could be referred to as motor drives (e.g., where the one or more loads comprise one or more motors). The power converters may be used to power (e.g., control or actuate) the one or more loads. The power converters may be arranged in a parallel configuration and could be configured to power (e.g., control or actuate) a single load, or a plurality of loads. In the latter case the output of the power converters could be connected to the loads via a switch that is configured to electrically connect each load with a selected one or more of the plurality of power converters. The power converters could be located on an aircraft and may be configured to power (e.g., control or actuate) one or more aircraft components such as a thrust reverser or landing gear actuator. The components may not require power at the same time or concurrently.

An architecture/system for controlling/actuating one or more loads is disclosed in accordance with various embodiments, wherein the architecture/system comprises a plurality of power converters (e.g., motor drives) that are operatively connected to one or more loads. The power converters may be configured to control (e.g., power, actuate or otherwise move) the one or more loads. The loads may be or comprise an actuator and/or motor, although the disclosure is not limited as such and the loads could be any suitable load that can be powered by a plurality of power converters. The various components of the architecture, including the power converters (e.g., motor drives), loads and actuators, may be electronically controlled.

The power converters may be connected in a parallel configuration, such that a plurality of power converters may be used to actuate the same load. In this manner, a plurality of power converters may be provided that are used to actuate a single load (see, e.g., FIG. 2), or a plurality of power converters may be provided that are configured to actuate multiple loads. In the latter case, a switch may be configured to select the power converter(s) from the plurality of power converters and operatively connect the selected power converters to each respective load. The switch may be configured so that only one load is being driven by the plurality of power converters (e.g., a selected one or a subset thereof) at a particular time. The plurality of power converters may be powered by the same power supply and each may include an inverter.

The plurality of power converters (e.g., motor drives) typically need some sort of common or centralised operation (e.g., control), for example to synchronise their operation. The central control may be configured to control, for example, which power converter(s) are to be used (e.g., selected as discussed above) to power a given load or loads at a particular time. The control may achieve this by switching between the power converters (e.g., the inverters thereof), for example powering the load or loads using only a selected one or subset of the power converters at a given time. In various embodiments a modulation technique may be used to do this, for example using the modulation module described herein.

As noted above it is desired to reduce reliance on the central control as much as possible, and the present disclosure aims at improving the current balancing between power converters (e.g., the inventers thereof).

As discussed above, power converters connected in parallel may be subject to current balancing issues. This can be as a consequence of practical operating conditions and in particular circulating currents. Depending on the control architecture used in connection with the power converters, the power converters may receive the same signals from the central control, such as a duty cycle reference, and subsequently should generate the same modulation waveforms.

Despite this the total current may not be evenly shared across the inverters of the power converters, for example due to differences in the propagation time of gate driver circuits, in impedance of the magnetic components, or in the conduction voltage drop of inverter switches. These differences may be caused by unequal operating temperature of the inverters, or tolerances of the components. This will, in turn, result in circulating current flows, leading to a reduction in the total useful current being supplied to the load(s). This has a negative impact on the system as a whole.

The power converters may be controlled centrally using a modulation module, for example using pulse width modulation ("PWM") and in particular space vector modulation ("SVM"), wherein each power converter includes a modulation module configured to control the timing/synchronisation of the power converters (e.g., motor drives), for example a switching frequency thereof.

Figure 3:
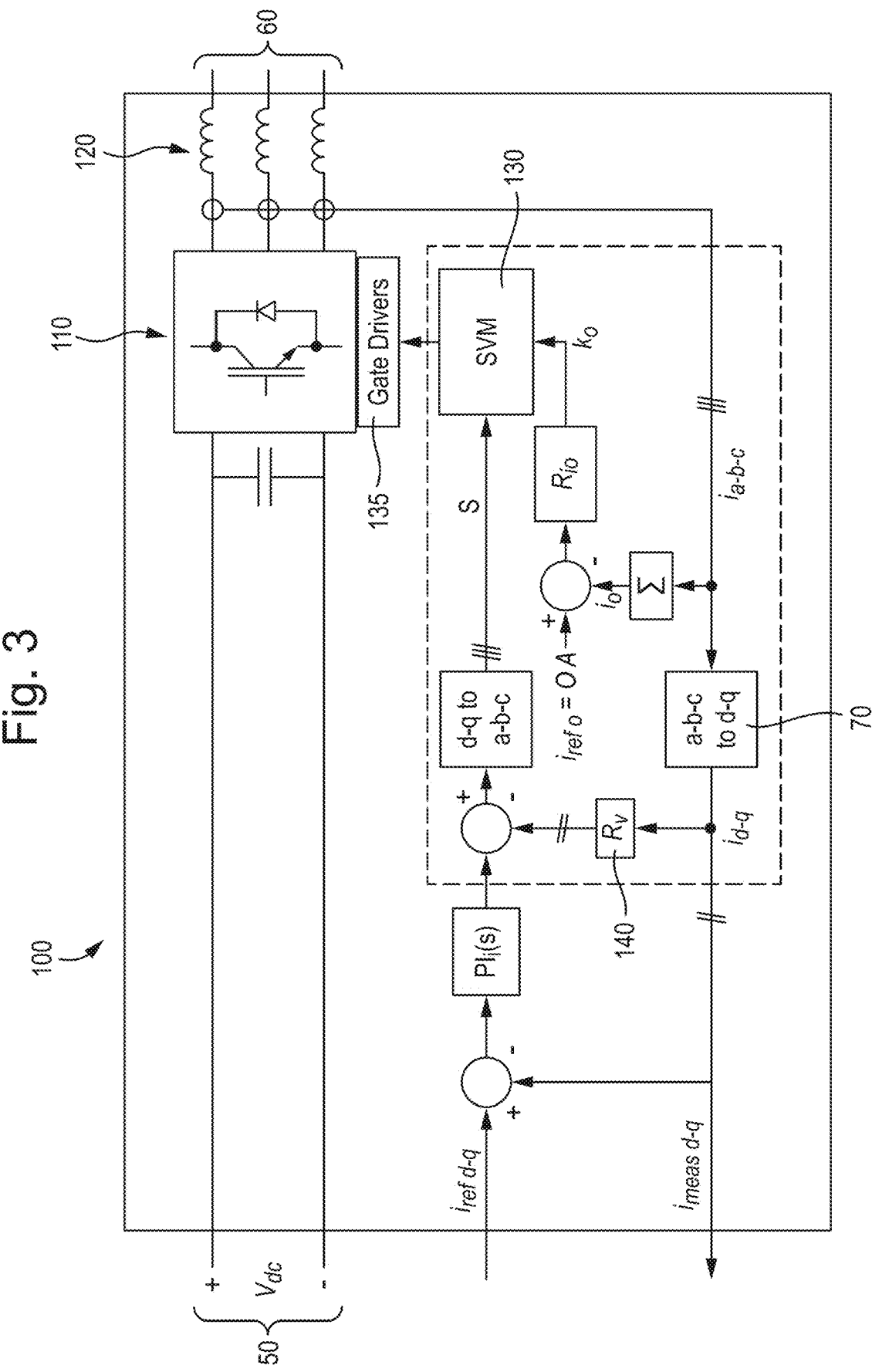
FIG. 3 shows a power converter, which in this case is a motor drive, according to various embodiments.

FIG. 3 shows a circuit diagram indicating a power converter, which in this case is a motor drive 100, according to various embodiments. As will be appreciated, a control architecture/system in accordance with the disclosure may include a plurality of power converters (e.g., motor drives 100), all of which may have the same or similar features as indicated in FIG. 3. That is, the power converter of FIG. 3 (and those of the present disclosure) may be included as part of the wider control architecture/system. The technology disclosed herein acts to improve current sharing, but it will be appreciated that control elements or modules of the wider control architecture/system will be configured to regulate total load current, manage parallel operation, etc.

It will be appreciated that references to motor drives in accordance with various embodiments could refer to any type of power converter, and the broadest aspects of the present disclosure are not intended to be limited to using motor drives, or providing a load in the form of a motor.

It is envisaged that the power converters (e.g., motor drives) described herein could comprise additional control circuitry, such as current or speed control loops. However, these are not considered essential to the concepts achieved by the presently disclosed technology. For example, various control schemes could be used, including one or more of speed control, current control, etc. so long as a current balancing architecture is provided as described herein.

In this regard, the control architecture/system can be said to be applicable to any suitable scheme known in the art that facilitates the implementation of a plurality of power converters in a parallel configuration. In other words, the present disclosure is not limited to a particular type of parallel architecture.

Figure 2:
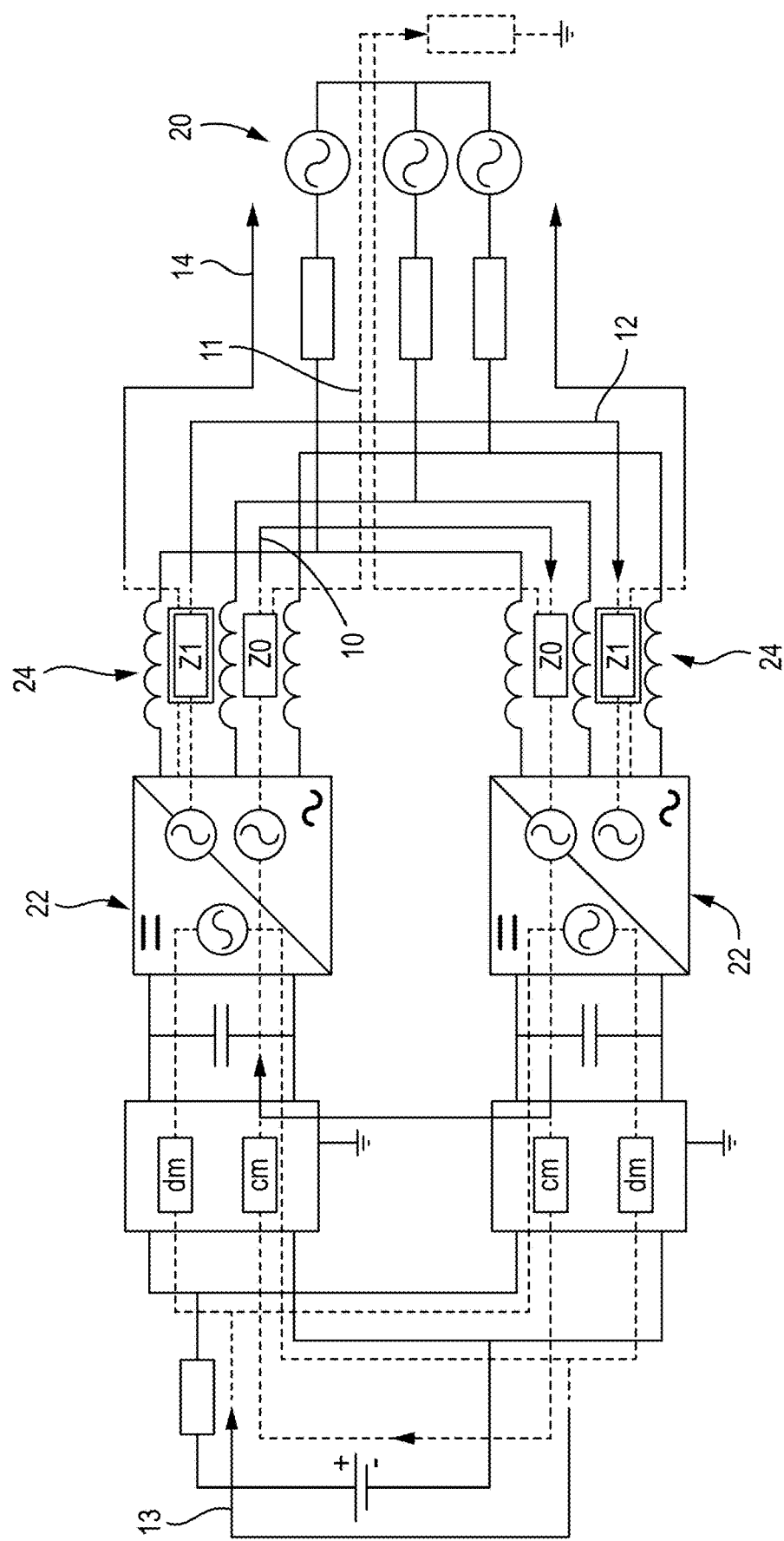
FIG. 2 shows a dual motor drive system with a single load (in this case a motor) powered by two motor drives.

For example, the technology disclosed herein is not dependent on local controllers (e.g., circuitry) for the power converter to regulate output current or machine speed. That is, the technical effects of the disclosure are not dependent on control circuitry outside of the first and second feedback circuits described below. A reference signal may be received (generated locally or globally) which is used then as an initial "reference signal" for the modulation, for example to be summed with the various other signals, as described in more detail below. The motor drive 100 of FIG. 3 includes an inverter 110 and may comprise output inductors 120. As with a typical arrangement (such as shown in FIG. 2 above) the motor drive 100 may receive DC power via input terminals 50. This may then be converted by the inverter 110 into an output voltage (e.g., three-phase AC voltage) for actuating one or more loads, e.g., via inductors 120 and output terminals 60.

Generally, a modulation (e.g., PWM/SVM) module 130 is configured to generate appropriate signals (e.g., logic and/or switching signals) for the inverter 110 of the motor drive 100 (e.g., gate drivers 135 thereof) to provide a controlled commutation of the output voltages of the power converters (e.g., motor drives 100). The modulation module 130 may be configured to send suitable such signals to the inverter 110 that control the timings associated with the respective motor drive 100 (e.g., the output voltages thereof) in use. The signals may include various modulation control signals, such as a modulation duty cycle, and may be based on one or more voltage reference signals.

The modulation module 130 may receive a first reference signal S (e.g., voltage reference) that is the summation of a reference value $i_{ref}$ and a measured current $i_{d-q}$. In accordance with the disclosure, the measured current $i_{d-q}$ is scaled by a gain R. This technique is referred to herein as a 'virtual resistance'. That is, and as will described in more detail below, using this arrangement, the behaviour of a series resistor is emulated inside the motor drive 100.

Generation of the switching signals for the inverter 110 via the modulation (e.g., SVM) module 130 is facilitated by the use of the resulting voltage reference signal S. It will be appreciated that a standard or conventional modulation could typically use a current or voltage reference directly, that is without being scaled by a gain as disclosed herein.

A second reference signal, referred to herein as $K_0$, is also used by the modulation (e.g., SVM) module 130, wherein the second signal $K_0$ is based on a measurement/calculation of zero sequence current to adjust the modulation further. The signal $K_0$ is a summation of a reference current (which can be a reference current $i_{ref}$) and a measurement or calculation of zero sequence current $i_0$, as will be discussed in more detail below. The reference current ($i_{ref}$) can be set to be equal to zero Amps ($i_{ref}=0$ A), since we wish to regulate the zero sequence current (using the control scheme) to be zero.

Therefore, the modulation/commutation signals sent to each inverter 110 by the respective modulation module 130 may be adapted based on the first and second signals S, $K_0$. These adaptations of the commutation signals may effectively address the problems described above by forming active current balancing solutions. In particular, the two main approaches (i.e., using the first and second signals S, $k_0$) have been found to address these issues and will be described in more detail below.

The first approach is provision of a first feedback circuit (e.g., forming a first compensation loop within the motor drive 100) aimed at dealing with (e.g., reducing) the positive and negative circulating currents. This is through what may be referred to as a "virtual resistor" 140, by which it is meant components or circuitry configured to emulate a series resistor within the motor drive 100. The resistance value of the virtual resistor 140 can be referred to as a gain (IL) and can be preset based on the response of the system to positive and negative circulating currents.

More specifically, the current values of the three phases (i.e., the instantaneous inverter 110 output currents) are measured and/or determined. Suitable components or circuitry 70 may be configured to determine the output currents. See, for example, Venkataramanan, "Parallel Operation of Voltage Source Inverters with Minimal Intermodule Reactors", in proc. of IEEE Industry Applications Conference, 2004, which is incorporated by reference herein in its entirety. The output currents (e.g., phase currents) could be measured and/or determined using a current sensor, although any suitable technique could be used, with optionally a current sensor provided for each of the three phases.

The positive and negative sequence currents are an inherent property of the output currents of the motor drive 100 (and other motor drives in the distributed system), and can be represented using a simplified circuit representation, from which it is possible to derive transfer functions to analyse the impact of the gain $R_v$ variation on the distributed system. That is, the distributed system 100 may use a synchronous reference frame (also called "d-q control"). Using such a control mechanism, the voltage and current can be converted into a reference frame that rotates synchronously with a voltage vector (e.g., by Park Transformation) so that three-phase time-varying signals are transformed into DC signals. While it may be useful to implement the power converter (e.g., motor drive) control in a synchronous reference frame (e.g., d-q domain), the first feedback circuit may be implemented using synchronous or stationary reference frames.

The positive and negative sequence currents may be measured and/or determined, e.g., as described above, and multiplied or scaled by a resistance value or gain $R_v$ (i.e., of the virtual resistor 140), and then summed with a reference value $i_{ref}$ to provide a modulation signal S that is configured to balance the output currents of each motor drive 100 across the parallel architecture (i.e., substantially reduce any differences in the output currents between the motor drives).

The resistance value or gain $R_v$ of the virtual resistor 140 could be calculated, for example, using frequency response analysis such as via Bode plot analysis so as to provide useful values of $R_v$ to be applied to the measured current values $i_{thq}$. The resistance value or gain $R_v$ could be set prior to operation (e.g., preset or otherwise predetermined) or as part of a calibration or pre-processing routine. Any suitable type of analysis could be used to set the value, for example state space analysis, circuit analysis. Within frequency response analysis, a Bode plot may be used to determine the gain, but other methods could be used such as a Nyquist plot, Nichols plot, etc.

Figure 4:
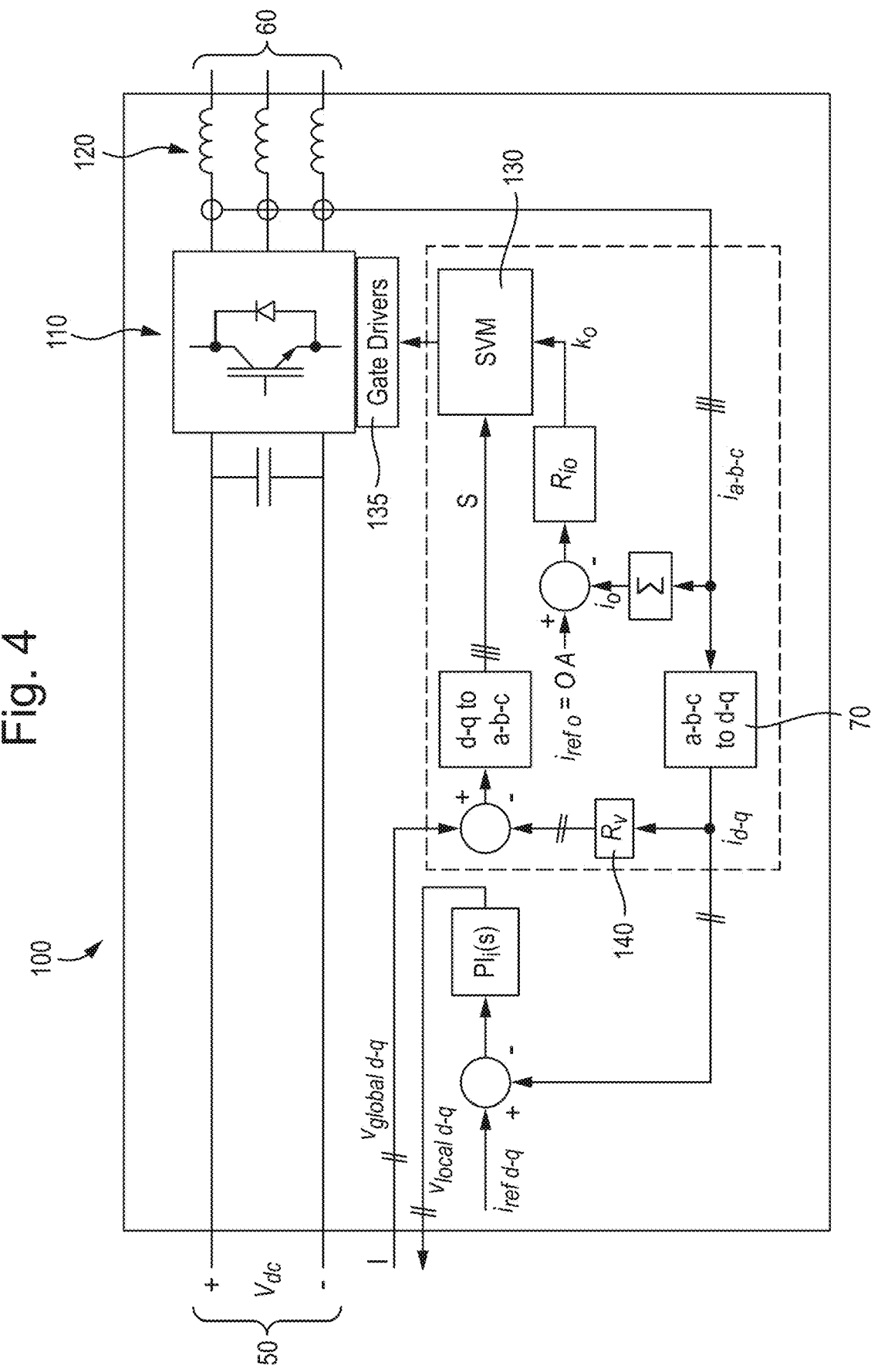
FIG. 4 shows an embodiment of the present disclosure that is similar to that of FIG. 3, in which like components are indicated with like reference numerals, but wherein a reference signal is provided in the form of a global voltage setpoint.

Parallel operation of the various motor drives 100 of the distributed system could be controlled using a reference value, e.g., in the form of a current setpoint $i_{ref}$ which may be generated locally to the motor drive as shown in FIG. 3 (whilst being common across the motor drives), or received from a central controller (e.g., processor or circuitry) as shown in FIG. 4. This means that the techniques of the present disclosure could be used to provide a decentralised or local current balancing for each motor, with a shared control reference, e.g., in the form of a current setpoint $i_{ref}$. As discussed with reference to FIG. 4, the control reference could be provided in the form of a voltage ($V_{global}$).

Generally, the reference value may be a voltage setpoint which can be generated via a local control loop (e.g., FIG. 3) or from a global controller (e.g., FIG. 4), which reference value is modified within each motor drive using the first feedback circuit. The modification by each first feedback circuit may be configured to adjust the modulation of the output currents so that they are balanced across the parallel architecture.

That is, by emulating the same resistor in each of the motor drive inverters 110 of the distributed system, differences in the positive and negative sequence currents due to circuit impedances can be alleviated. This occurs even if the virtual impedances are not exactly equal due to the tolerance of the current sensors, for example. The behaviour of the distributed system, in this regard, is intuitive. That is, if a first motor drive tends to provide more current than a second motor drive, the system will adapt the modulation to balance this out, for example by adapting (e.g., reducing) the duty cycle of the first motor drive so that the current output by both the first and second motor drives balances. In other words, the modulation (e.g., duty cycle) may be automatically adapted based on the differences in the positive and negative sequence currents.

In this manner, a first feedback or compensation loop may be formed in each motor drive 100 of the distributed system, which first feedback loop is configured to alleviate differences between the motor drives 100, for example due to differences in circuit impedance, component tolerance, sensor tolerance, etc.

The second approach is made up of a second feedback circuit (e.g., forming a second compensation loop) aimed at compensating for (e.g., reducing) zero sequence circulating currents. This consists in using the current values of the three phases (i.e., the instantaneous inverter 110 output currents referred to above) to measure and/or determine zero sequence local currents and adjust the modulation accordingly so as to balance zero sequence currents between the power converters in the architecture.

For example, in SVM the length (i.e., duration in time) of a zero state vector could be adjusted or modulated based on a second signal $k_0$, which corresponds to the measured zero sequence current $i_0$ scaled by a gain $R_{i0}$. As is known in the art, a zero-state vector is one of the operating states of SVM. A controller or compensator may be configured to drive the signal $k_0$, which is received and used by the modulation module 130 to adjust or modulate the duration of the zero state vector in SVM.

The controller or compensator may be referred to as 'closed loop', meaning that it is configured to measure the state in the system being regulated (i.e., in this case the zero sequence current $i_0$). The zero sequence current $i_0$ is compared to a reference (e.g., reference current $i_{ref}$), and then an error is generated corresponding to the difference between the zero sequence current and the reference. This error is then scaled by a control gain $R_{i0}$ to form the signal $k_0$, which is subsequently used by the modulation module 130 to adjust the modulation so that the zero sequence current $i_0$ is minimised.

Similar techniques are reported in "Control of Circulating Current in Two Parallel Three-Phase Boost Rectifiers" to Zhihong Ye, et al. (IEEE Transactions on Power Electronics, Vol. 17, No. 5, pp. 609-615, September 2002), which is incorporated herein by reference in its entirety.

As noted elsewhere herein, there are different mechanisms that cause zero sequence circulating current. In the embodiment shown in FIG. 3, the gate drivers 135 comprise circuitry, for example there may be an electrical connection (e.g., a cable) interconnecting between the module 130 and the inverter 110 to transmit the modulation signals from the module 130 to the inverter 110. Since these are non-ideal systems, there may be propagation delays, or the gate driver 135 circuitry may have slight differences in the electronics within it. This means, for example, if control signals acting on a first switch in a first motor drive and a first (i.e., equivalent) switch in a second motor drive switch on at the same time, there might be a slight timing difference. This is a mechanism for zero sequence current generation, which would be reduced by the second feedback circuit.

FIG. 4 shows an embodiment of the present disclosure that is similar to that of FIG. 3, in which like components are indicated with like reference numerals, but wherein a (control) reference signal is provided in the form of a global voltage setpoint $v_{global}$. This is summed with the signal output from the virtual resistor, rather than the current setpoint $i_{ref\_d-q}$ of the embodiment of FIG. 3. For the purposes of the present disclosure, either a current or voltage setpoint could be used to provide the reference signal for the first feedback circuit.

Generally, using the combination of the first and second feedback circuits results in an improved current balancing of the system. The first feedback circuit ("virtual resistor") is aimed at dealing with (e.g., balancing/reducing) positive and negative sequence currents, whilst the second feedback circuit deals with (e.g., balances/reduces) zero sequence currents. The combination of both feedback circuits contributes to the improvements in current sharing and compensating for the major sources of system imbalance. Using both improves the balancing of the currents that can circulate in the system (see FIG. 5).

That is, the proposed technology combines these two methods in a distributed control architecture, where each element of the feedback circuits operates locally for each respective motor drive. Although the modulation module typically receives a reference, such as from a central controller (e.g., a current or voltage setpoint), the feedback circuits are not reliant on inter-module communications, or complex communications from a central location to help improve the current balancing between the parallel motor drives.

It should be noted that the proposed architecture is scalable to N-paralleled inverters, where N=2, 3, 4 or more, without the need of modifying the control architecture (e.g., local circuitry) of each motor drive. That is, the feedback circuits are common to all motor drives in the control architecture. Moreover, the same architecture can be used for a motor drive operating in a stand-alone mode, and motor drives can be interchanged or scaled without any substantial modification to the central control.

In this regard a structure may be provided and configured to receive and hold multiple power converters (e.g., motor drives 100) as described above, wherein the structure is configured to interconnect the power converters held and received within the structure such that a variable number of power converters may be interconnected using the structure as desired. The distributed architecture/system could include the structure, which could then be configured such that a single power converter can be connected thereto for providing power to one or more loads in a standalone configuration, as well as up to N power converters (and any integer in between) connected thereto for providing power to one or more loads in a parallel configuration. N is an integer greater than 1, and could be at least 3, 4, 5 or 10.

It is important to note in the context of modular and reconfigurable systems, that the disclosed technology can facilitate operation in a stand-alone mode for a single power converter, or in a parallel configuration, and without significant reconfiguration of power converter control architecture. This is because the first and second feedback circuits are provided locally to each power converter.

Embodiments of the proposed control scheme are illustrated in FIGS. 3 and 4, which illustrate two different structures of the overall parallel control configuration, based on either centralised global current or global voltage reference controls. Regardless of the system level parallel control architecture, the local circulating current balancing controls can be implemented in a common, distributed manner.

Figure 5:
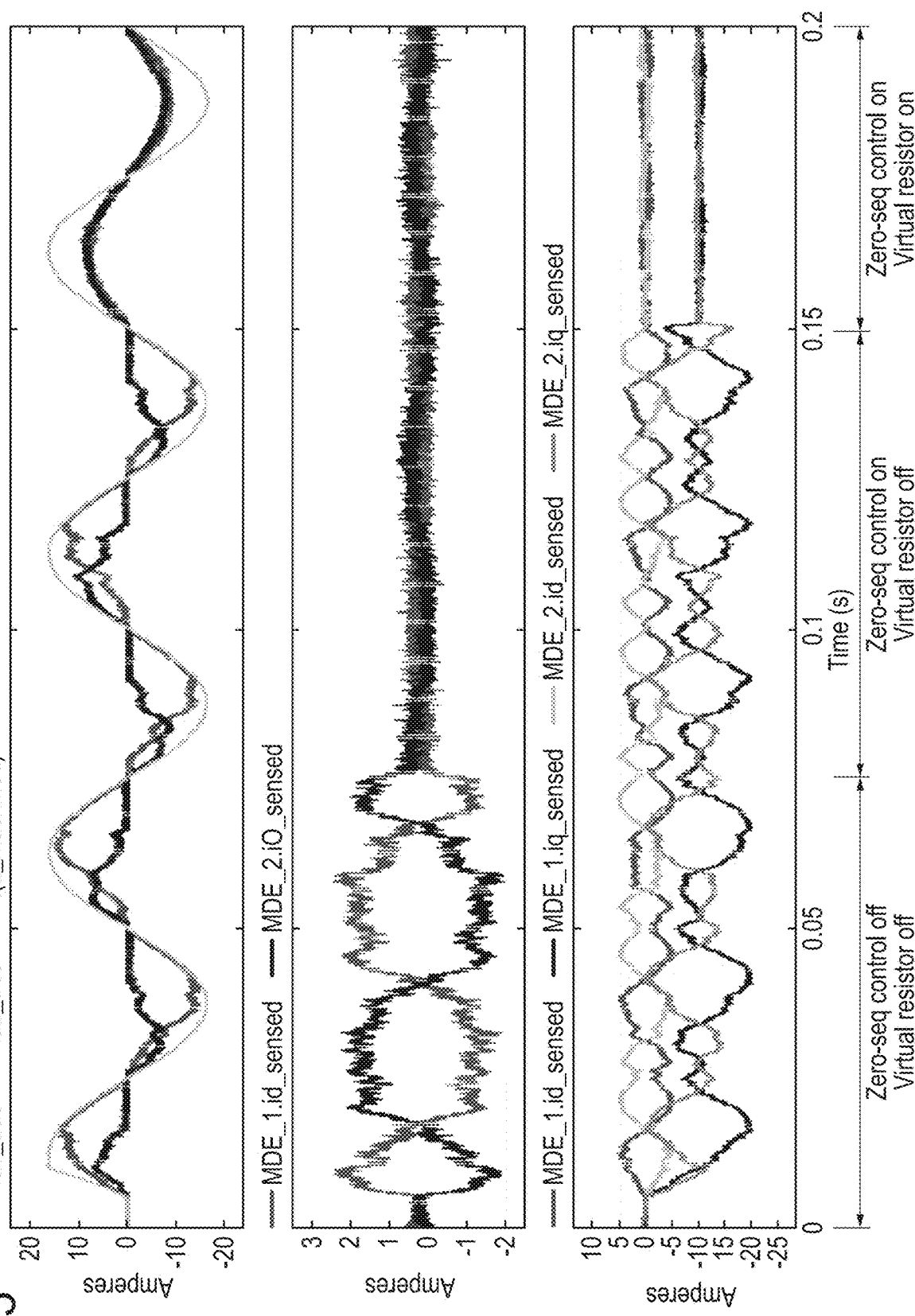
FIG. 5 shows results of a simulation to illustrate the effects of implementing the first and second feedback circuits described herein.

FIG. 5 shows results of a simulation to illustrate the effects of implementing the first and second feedback circuits described above. In FIG. 5, the performance of two paralleled motor drives that are configured to drive a permanent magnet motor is shown.

Differences in gate driver propagation time, inductor impedances, current sensor gains, and conduction voltage drop within the inverter semiconductors are modelled in order to create circulating currents, e.g., due to tolerances or temperature differences, to emulate real operating conditions.

Initially, no balancing methods are used. At 75 ms, the zero sequence controller (i.e., second feedback circuit) is activated. At 150 ms, the virtual resistor (i.e., first feedback circuit) is activated. The parameters used in the simulation are as follows.

AC inductance at the output of each inverter=70 μH±10%

Current sensors tolerance=±5%

15 mΩ and 35 mΩ Rds-on SiC MOSFETs resistance on each inverter (devices assumed to operate at different temperatures).

Dead time=500 ns±25 ns.

Switching frequency=20 kHz; current loop sampling frequency=40 kHz.

Current loop cross-over frequency and phase margin=800 Hz, PM=60 deg.

Gain of zero sequence compensator=0.0024 V/V. Virtual resistor=1Ω

Motor phase inductance and resistance=4.5 mH, 0.1Ω. Pole pairs=2.

Motor back electromotive force constant=48 Vline-line peak/krpm.

Machine speed=600 rpm. D-Q current set points are constant.

The plotted signals are as follows: In the first plot, the phase "a" current through inverter "1", inverter "2", and the total machine current are shown, namely, $i_{a1\_true}$, $i_{a2\_true}$ and $i_{machine\_a}$. This is the "true" current, meaning that the current sensor has no tolerance or error.

In the second plot, the zero sequence current is shown.

In the third plot, the measured d-q motor current signals captured locally by each inverter are shown. As is known in the art, d-q currents are representative of positive and negative sequence currents. In other words, they are different ways of representing the output current of the motor drive, and a convenient way of analysing the system.

As can be seen in FIG. 5, the total motor current is sinusoidal and well regulated, but there is an imbalance in the current being provided by each inverter. This imbalance is reflected in zero sequence current and positive/negative sequence currents. The latter imbalance is reflected both in positive sequence (differences in the DC current level) and in the negative sequence (oscillations at two times the fundamental frequency).

Once the zero sequence regulator (second feedback circuit) is activated after 75 ms, it can be seen from FIG. 5 that the zero sequence currents get tightly regulated to zero amperes. However, the imbalance in the positive and negative sequence currents remain and has not been affected by the zero sequence controller. The virtual resistor (first feedback circuit) is activated after 150 ms, and it can be seen that the currents provided by each inverter become well balanced due to the reduction (and in this ideal simulation, elimination) of the positive and negative sequence currents. This demonstrates the adequate operation of the feedback circuits presented herewith.

Additional testing has been carried out to demonstrate the functionality of the technology described herein. An example set of experimental results demonstrating the operating and impact of the current balancing control scheme proposed by this disclosure is detailed below and shown in FIG. 6.

Test Configuration:
Current control, three motor drives in parallel
Vdc=540V, w*=100 rad/s, DT=0.7 μs
Lout=60 μH
Parallel controls: Ri0=0.3, Rv=0.8Ω

Figure 6A:
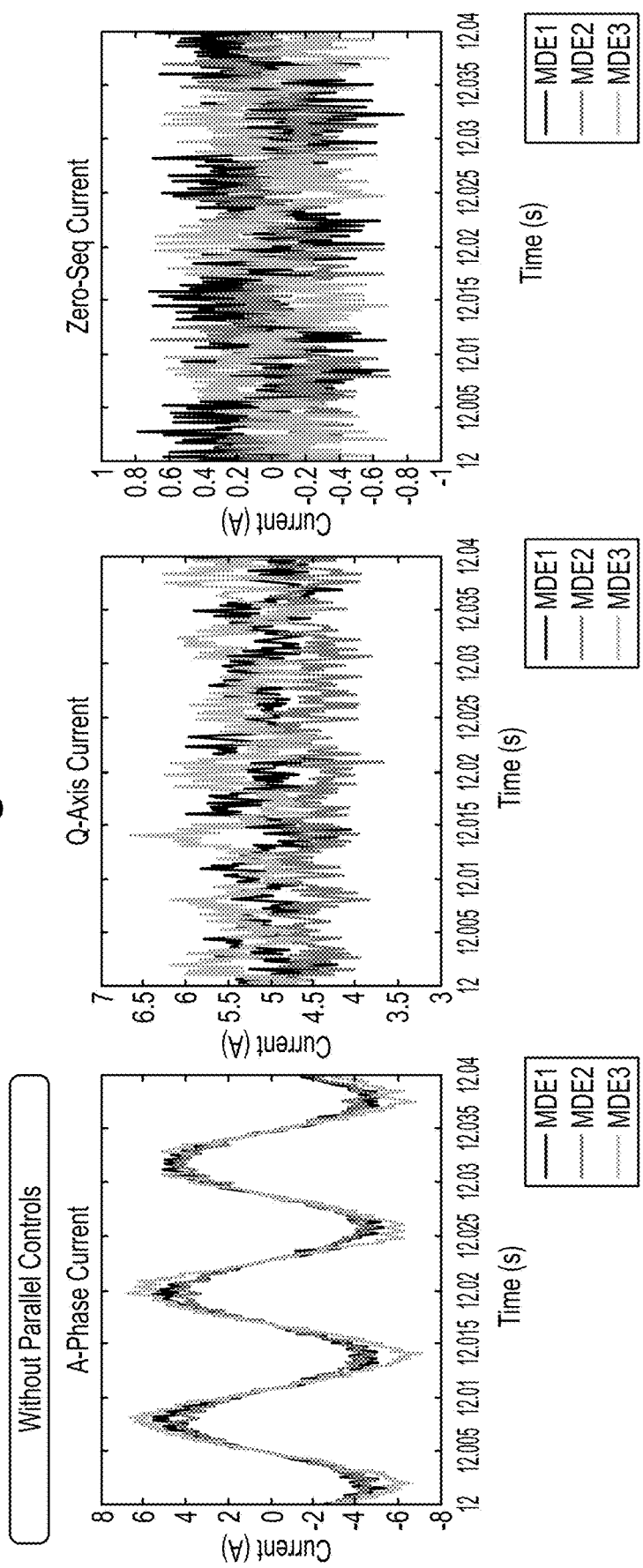
FIGS. 6A and 6B show an example set of experimental results demonstrating the effects of implementing the first and second feedback circuits described herein.
Figure 6B:
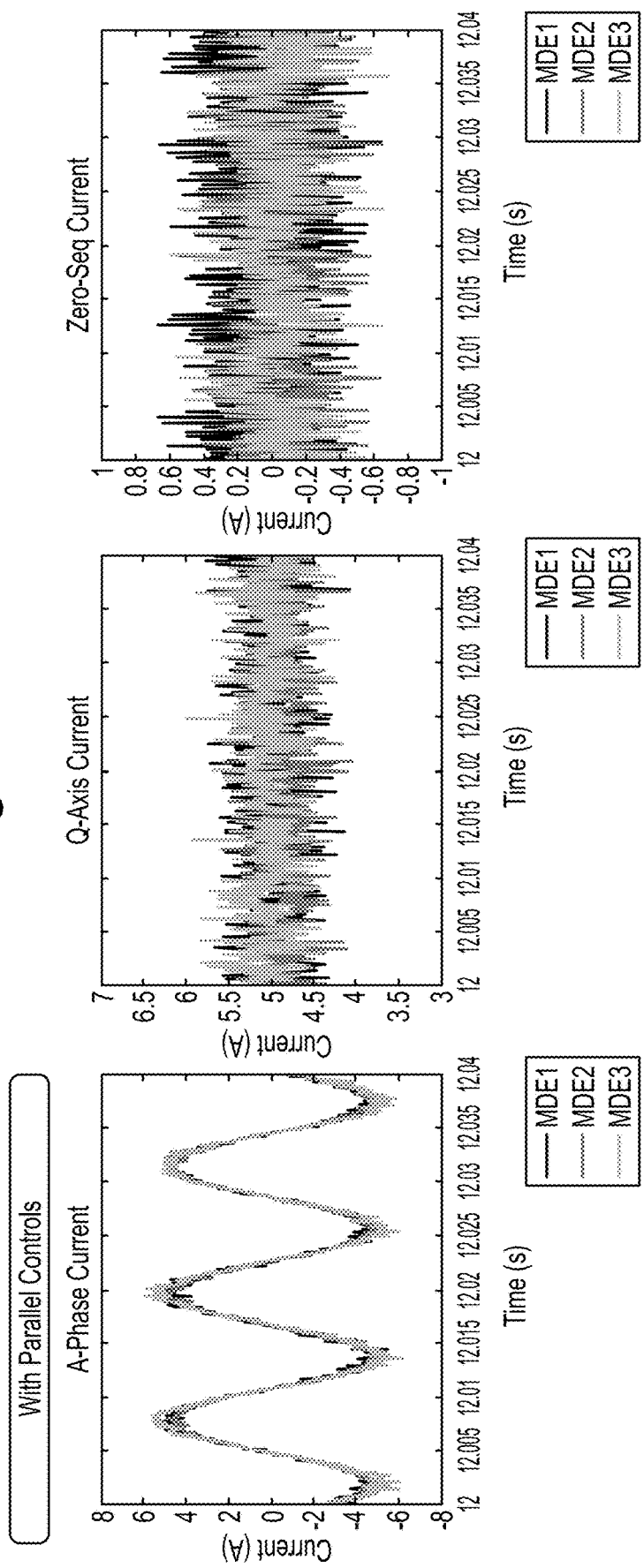

FIGS. 6A and 6B show the experimental results for three motor drives operating in parallel without (FIG. 6A) and with (FIG. 6B) the current balancing feedback circuits described above. The improvement in current sharing between the phases of the motor drives can be clearly seen with the current balancing feedback circuits activated.

Although the present disclosure has been described with reference to various embodiments, it will be understood by those skilled in the art that various changes in form and detail may be made without departing from the scope of the invention as set forth in the accompanying claims.

The invention claimed is:

1. A system for controlling one or more motors, the system comprising a plurality of power converters, each power converter for providing power to the one or more motors, wherein the power converters are configured in a parallel configuration with each other and each power converters comprises:
    an inverter for receiving an input voltage and converting this to an output voltage having an associated output current;
    a module configured to modulate the output voltage using a modulation scheme;
    a first feedback circuit configured to configured to generate a first signal, wherein the first signal corresponds to a summation of a first reference signal and a first measurement/calculation of the output current scaled by a first gain, wherein the first gain is set so as to reduce circulating currents between the power converter and one or more additional power converters in the parallel configuration due to imbalance of positive and/or negative sequence currents; and
    a second feedback circuit configured to compare a second reference signal and a second measurement/calculation of the output current to produce an error value, wherein the error value is scaled by a second gain to produce a second signal, wherein the second gain is set so as to reduce circulating currents between the power converter and one or more additional power converters in the parallel configuration due to the imbalance of zero sequence currents,
    wherein the modulation module is configured to receive the first signal and the second signal and adjust the modulation based on the first signal and the second signal so as to reduce circulating currents as aforesaid,
    wherein the plurality of power converters are configured to control the one or more motors, wherein the first and second feedback circuits of each power converter are configured as aforesaid so as to reduce circulating currents between the power converters.

2. The system as claimed in claim 1, wherein the input voltage is a DC input voltage and the output voltage is a three-phase output voltage.

3. The system as claimed in claim 1, wherein the modulation scheme includes pulse width modulation, and the first reference signal used in the first feedback circuit is a setpoint for use in the pulse width modulation.

4. The system as claimed in claim 1, wherein the first gain is set such that, for a range of values of the output current, a value of the first gain is chosen that reduces circulating currents between the power converter and one or more additional power converters in the parallel configuration due to imbalance of positive and/or negative sequence currents.

5. The system as claimed in claim 4, wherein the first gain is preset or otherwise predetermined as part of a calibration or pre-processing routine.

6. The system as claimed in claim 5, wherein the gain is preset or predetermined using frequency response analysis.

7. The system as claimed in claim 1, wherein the error value corresponds to a difference between the second reference signal and the second measurement/calculation of the output current.

8. The system as claimed in claim 1, wherein the modulation scheme uses space vector modulation, and the modulation module comprises a processor or circuitry configured to modify one or more vectors used in the space vector modulation based on the second signal.

9. The system as claimed in claim 8, wherein the processor or circuitry of the modulation module is configured to adjust a length or duration of one or more vectors based on the second signal.

10. The system as claimed in claim 9, wherein the processor or circuitry of the modulation module is configured to drive a modulation signal based on a zero state vector, which modulation signal is used to adjust the length or duration of the zero state vector by the processor or circuitry as aforesaid.

11. The system as claimed in claim 1, wherein the modulation module is configured to adjust a modulation duty cycle based on the first signal and/or the second signal so as to reduce circulating currents as aforesaid.

12. The system as claimed in claim 1, wherein the modulation module is configured to adjust a length or duration of one or more vectors of a space vector modulation scheme based on the first signal and/or the second signal to so as to reduce circulating currents as aforesaid.

13. The system as claimed in claim 1, further comprising a structure configured to receive and hold multiple power converters, wherein the structure is configured to interconnect the power converters held and received within the structure such that a variable number of power converters may be interconnected using the structure as desired.

14. The system as claimed in claim 13, wherein the structure is configured such that a single power converter can be connected thereto for providing power to the one or more motors in a standalone configuration, as well as up to N power converters connected thereto for providing power to one or more motors in a parallel configuration, wherein N is an integer greater than 1.

* * * * *